(12) United States Patent
Mixter (10) Patent No.: US 11,537,848 B2
(45) Date of Patent: Dec. 27, 2022

(54) CLASS LEVEL ARTIFICIAL NEURAL NETWORK

(71) Applicant: Raytheon Company, Waltham, MA (US)

(72) Inventor: John E. Mixter, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1189 days.

(21) Appl. No.: 16/046,416

(22) Filed: Jul. 26, 2018

(65) Prior Publication Data

US 2020/0034691 A1 Jan. 30, 2020

(51) Int. Cl.
*G06N 3/04* (2006.01)
*G06N 3/08* (2006.01)

(52) U.S. Cl.
CPC .............. *G06N 3/0454* (2013.01); *G06N 3/04* (2013.01); *G06N 3/08* (2013.01)

(58) Field of Classification Search
CPC ........... G06N 3/0454; G06N 3/04; G06N 3/08
See application file for complete search history.

(56) References Cited

U.S. PATENT DOCUMENTS

| 10,599,984 | B1 * | 3/2020 | Wubbels | G16H 30/40 |
| 2017/0091627 | A1 * | 3/2017 | Terrazas | G06F 16/29 |
| 2018/0350069 | A1 * | 12/2018 | Nakano | G06T 7/0012 |
| 2019/0197395 | A1 * | 6/2019 | Kibune | G06N 3/082 |
| 2020/0175675 | A1 * | 6/2020 | Ogino | A61B 6/03 |
| 2020/0257975 | A1 * | 8/2020 | Chang | G06N 3/04 |

FOREIGN PATENT DOCUMENTS

WO WO-2020023748 A1 1/2020

OTHER PUBLICATIONS

Escalante et al., "Sow-activity classification from acceleration patterns: A machine learning approach", Feb. 24, 2013, Computers and Electronics in Agriculture vol. 93, Apr. 2013, pp. 17-26. (Year: 2013).*
Sesmero et al., "An ensemble approach of dual base learners for multi-class classification problems", Sep. 22, 2014, Information Fusion 24 (2015), pp. 122-136. (Year: 2014).*
"International Application Serial No. PCT US2019 043442, International Search Report dated Oct. 30, 2019", 4 pgs.
"International Application Serial No. PCT US2019 043442, Written Opinion dated Oct. 30, 2019", 11 pgs.

(Continued)

*Primary Examiner* — Ying Yu Chen
(74) *Attorney, Agent, or Firm* — Schwegman Lundberg & Woessner, P.A.

(57) ABSTRACT

Classes are identified in a dataset, and an independent artificial neural network is created for each class in the dataset. Thereafter, all classes in the dataset are provided to each independent artificial neural network. Each independent artificial neural network is separately trained to respond to a single particular class in the dataset and to reject all other classes in the dataset. Output from each independent artificial neural network is provided to a combining classifier, and the combining classifier is trained to identify all classes in the dataset based on the output of all the independent artificial neural networks.

15 Claims, 6 Drawing Sheets

(56) References Cited

OTHER PUBLICATIONS

Anand, R, "Efficient Classification For Multiclass Problems Using Modular Neural Networks", IEEE Transactions On Neural Networks, IEEE Service Center, Piscataway, NJ, US, vol. 6, No. 1, (Jan. 1, 1995), XP000483011, (Jan. 1, 1995), 117-124.

Oil, Guobin, "Multi-class pattern classification using neural networks", Pattern Recognition, Elsevier, GB, vol. 40, No. 1, (Oct. 29, 2006), XP005837151, (Oct. 29, 2006), 4-18.

Oong, Tatt Hee, "One-against-all ensemble for multiclass pattern classification", Applied Soft Computing, vol. 12, No. 4, (Apr. 1, 2012), XP028891370, (Apr. 1, 2012), 1303-1308.

Sesmero, M P, "A new artificial neural network ensemble based on feature selection and class recoding", Neural Computing And Applications, Springer-Verlag, Lo, vol. 21, No. 4, (Oct. 20, 2010), XP035055956, (Oct. 20, 2010), 771-783.

"International Application Serial No. PCT/US2019/043442, International Preliminary Report on Patentability dated Feb. 4, 2021", 10 pgs.

\* cited by examiner

CLASS LEVEL ARTIFICIAL NEURAL NETWORK

TECHNICAL FIELD

The present disclosure relates to artificial neural networks, and in an embodiment, but not by way of limitation, the creation and use of class level artificial neural networks.

BACKGROUND

A state of the art artificial neural network is built and trained to cover all classes in a given training set. That is, such a neural network is designed to learn an entire dataset and then is deployed as a static network. This results in a large neural network that has many classes that compete against each other for the best weight (or hyperparameter) settings during training. This competition results in slow execution and poor accuracy of the artificial neural network.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

An embodiment relates to class level artificial neural networks. Class level artificial neural networks are built and trained to identify two classes. One class is the target class, and the other class represents all other classes in the data. For each class in the training data, a single, independent class level artificial neural network is built and trained. Because each class level artificial neural network is independent of all the other independent class level artificial neural networks, all the independent class level artificial neural networks can be trained and executed in parallel. The training of a class level artificial neural network allows the neural network to be tuned for only one class, so there is no competition with other classes for the optimal weight (hyperparameter) settings. While the design of a class level artificial neural network can be arbitrary, and each class level artificial neural network can have its own architecture, the architecture for each class level artificial neural network can be chosen to optimize the performance for the class for which the class level artificial neural network is trained. The independent class level artificial neural networks can be thought of as narrow bandpass filters.

For example, using the MNIST (Modified National Institute of Standards and Technology) database of handwritten digits, a class level artificial neural network for the digit "0" requires a two level convolutional artificial neural network followed by a fully connected layer and a two class classifier. The first convolutional artificial neural network has a 7×7 filter kernel with a 3-pixel stride producing six feature maps. A second convolutional artificial neural network has a 5×5 kernel with a 1-pixel stride. The second convolutional artificial neural network produces twenty feature maps that are fed into the fully connected layer. In comparison, a class level artificial neural network for the digit "1" has a first convolutional artificial neural network with a 3×3 kernel stride and a stride of 2 with a 9 map output, and a second convolutional artificial neural network with a 6×6 kernel, a stride of 4 producing a 12 map output. In such a scenario, each digit in the MNIST dataset has its own class level artificial neural network that is tuned for that digit.

After a particular class level artificial neural network has been trained for its target class and all other classes, the all other classifiers and their weights can be eliminated because the particular class level artificial neural network is only concerned with the target classifier. The separation of a large artificial neural network into separate class level networks decreases complexity, increases accuracy, and reduces the size of the artificial neural network (e.g., because of the elimination of the other classifiers and their weights in each of the class level neural networks (that make up the entire artificial neural network)). Because each of the class level artificial neural networks are independent, they can be trained and executed in parallel, thereby resulting in a decrease in processing time.

For a given dataset of N classes, at a minimum, N class level artificial neural networks are grouped together to handle the entire dataset. If a new class is introduced into the artificial neural network, and the existing class level artificial neural networks do not respond to the new class, a new class level artificial neural network is added and trained to respond to this new class.

Figure 1:
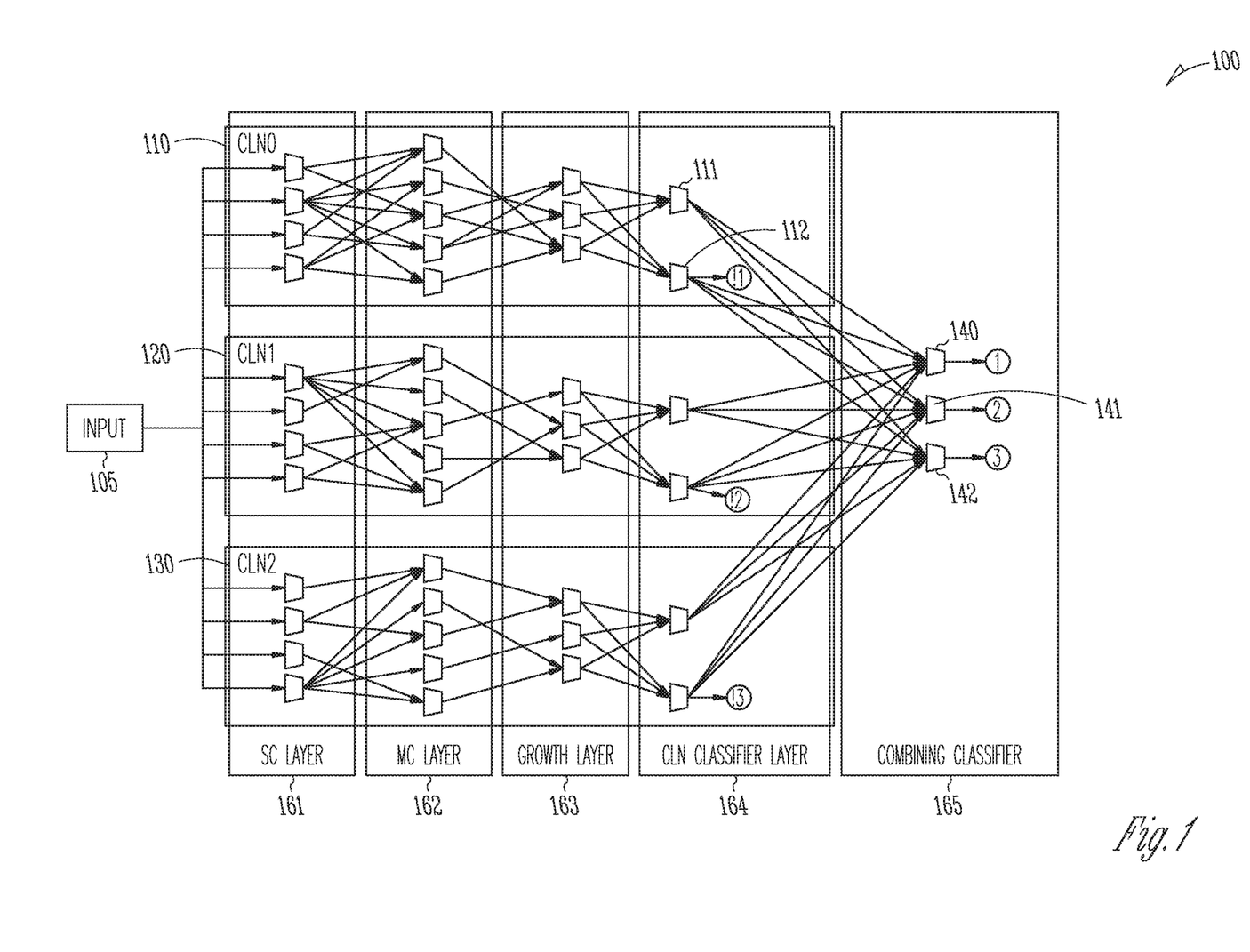
FIG. 1 is a block diagram of a class level artificial neural network.

FIG. 1 illustrates an example embodiment of a class level artificial neural network 100. In the example of FIG. 1, three different class levels 110, 120, and 130 are illustrated, but a typical class level artificial neural network would have many more class levels. For example, if the purpose of the class level artificial neural network is to identify the digits 0-9 in input data 105, there would be at least ten different classes in that particular class level artificial neural network. In fact, each digit may have several different independent class level networks that are separately trained to recognize that digit. Each class in the class level artificial neural network 100 in the example of FIG. 1 includes an SC layer 161, an MC layer 162, a growth layer 163, a classifier layer 164, and a combining classifier layer 165. The SC, MC, and growth layers are just one type of convolutional artificial neural network architecture, and other architectures could be used. The combining classifier layer 165 determines the identification of the input data if two or more different independent class level artificial neural networks or groups of class level networks positively respond to the input data.

Assuming as an example that the purpose of the class level artificial neural network 100 of FIG. 1 is to identify the digits 0-9, and class level 110 is tasked with recognizing the digit "0" in any input data 105, then the class level 110 is trained to identify only the digit "0". By training the class level 110 to only recognize the digit "0," the class level 110 will reject all other digits 1-9 (and indeed reject any other data in any other form). After training both the independent class level networks 110, 120, 130 and the combining classifier 165, when data are input into the class level 110, the weights or hyperparameters of the trained class level 110 are applied to the incoming data, and decisions are made in the SC, MC, and growth layers 161, 162, 163 based on those hyperparameters. If the classifier layer 164 for the independent class level network 110 recognizes the incoming data as a "0", then the data are placed into the node at 111. If the data are any one of digits 1-9 or other non-zero data, the data are placed into the node at 112. If only a single independent class level network (or only a single group of independent class level networks all trained to identify the same single class) reports that it has recognized the input data, the combining classifier can be bypassed, and the data reported as recognized by the single independent class level network.

However, if two or more independent class level networks report that they have recognized the input data 105, then node 111 from more than one independent class level network will report this to the neurons 140, 141, and 142 in the combining classifier 165, and the combining classifier must reconcile this discrepancy. This reconciliation process is described in connection with FIG. 1A. Each neuron in the combining classifier has been trained to identify its particular digit as follows. Data come into the input 105, and are distributed to each independent class level network 110, 120, 130, and 135. Once again, if the incoming datum is the digit "0," and only class level network 110 recognizes that datum as a "0," then the combining classifier is not invoked. However, for example, if independent class level network 130 reports that it recognizes the digit as a "2," then the combining classifier must reconcile this discrepancy, and make a determination as to whether the input datum 105 is the digit "0" or the digit "2." The combining classifier performs this function as follows.

Figure 1A:
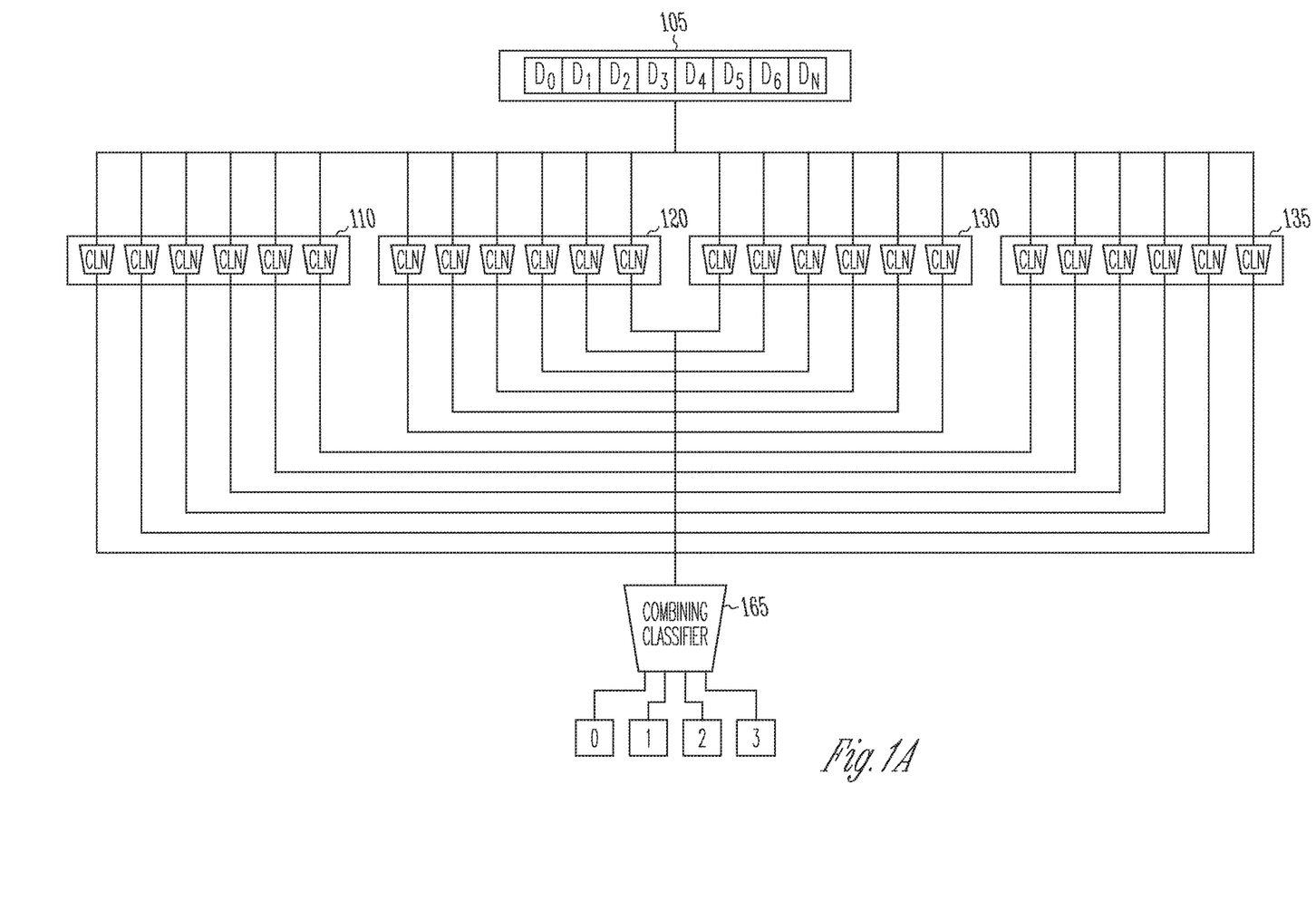
FIG. 1A is another block diagram of a class level artificial neural network.

When the independent neural network 110 is trained to recognize the digit "0" in a supervised mode, a plurality of digitized "0" training samples are provided to the class level networks for all groups—that is, the group of class level networks that are specifically being trained to recognize a "0" and the other groups of class networks that are being trained to recognize other digits. Each independent class level network in the groups of class level networks generates a value for each sample, which in an embodiment is the weight associated with the particular class level network multiplied by the pixel values of the sample (e.g., pixel values can be between 0 and 255 for a gray scale image). During the training, the weights of each independent neural network can be adjusted appropriately.

After the neural network is trained, real data are input into the class level network, and the pixel values of the real data are multiplied by the weights associated with each independent class level network. If the calculated value for the real data exceeds a threshold, then that class level network is signaled as having identified the real data. Referring again to FIG. 1A, many, but perhaps not all, of the neurons in 110 in FIG. 1A will report recognizing the "0". By the same token, one or more neurons in class level network 130 may report that it has recognized a "2," even though the real data consisted of a "0." To remedy this discrepancy, the combining classifier examines the actual values calculated by the reporting class level networks. The combining classifier will be able to determine that the calculated values of the real data align with the trained values for the 110 group of class level networks rather than the 130 group of class level networks.

Figure 2A:
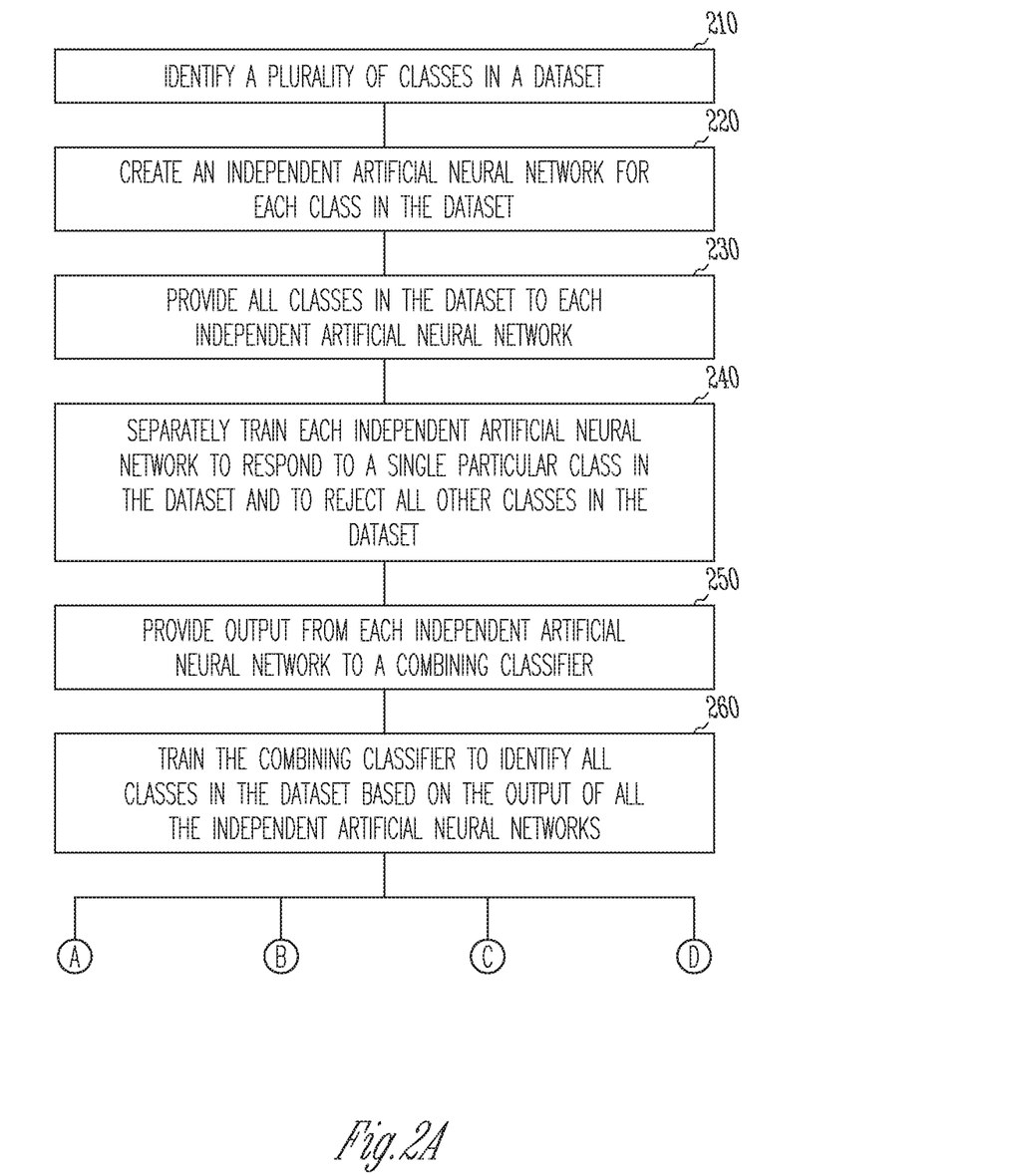
FIGS. 2A, 2B, and 2C are a block diagram illustrating operations and features of a class level artificial neural network.
Figure 2B:
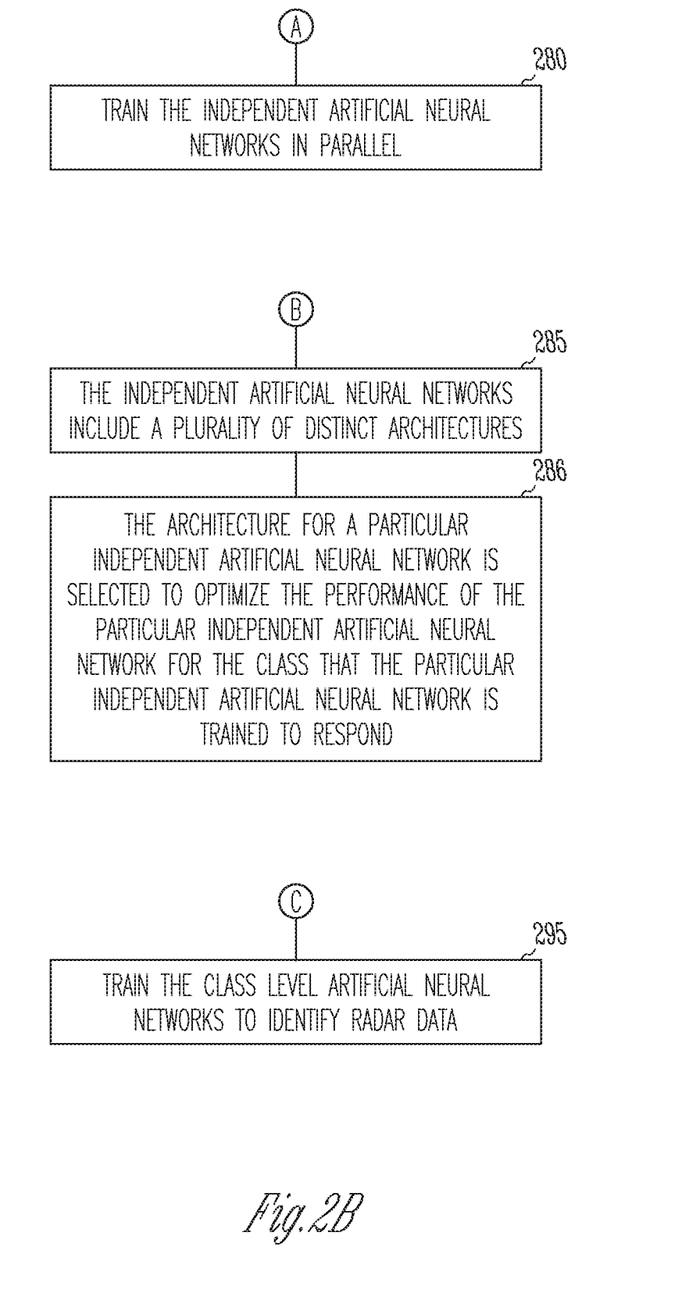
Figure 2C:
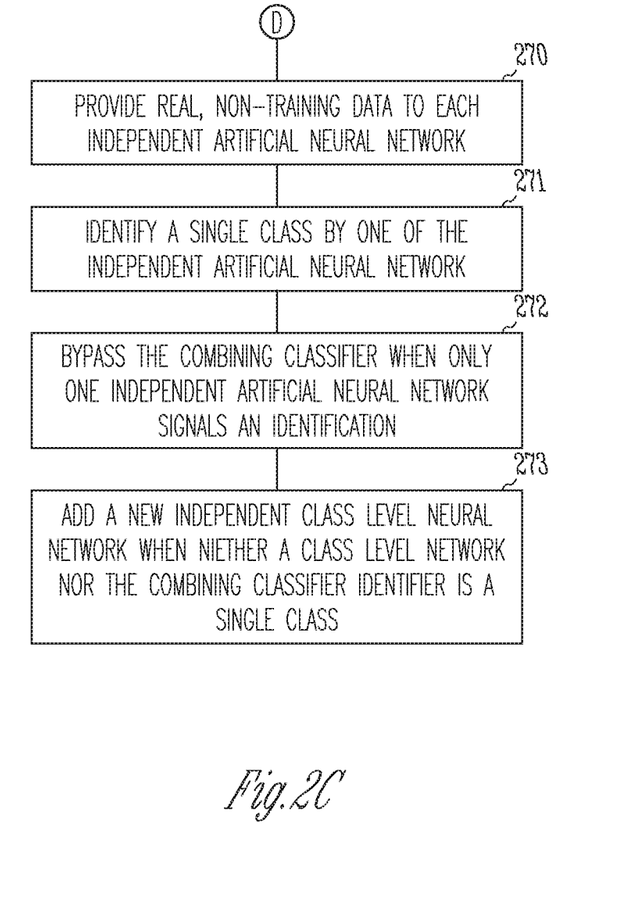

FIGS. 2A, 2B, and 2C are a block diagram illustrating operations and features of example systems and methods for creating and using class level artificial neural networks. FIGS. 2A, 2B, and 2C include a number of process blocks 210-295. Though arranged substantially serially in the example of FIGS. 2A, 2B, and 2C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 2A, 2B, and 2C, at 210, a plurality of classes is identified in a dataset. As known to those of skill in the art of artificial neural networks, a class relates to an object or entity that shares similar features, or in other words, is basically the same thing. For example, a class can be all cats (versus dogs which would be considered a different class), all the numerical digits 0-9 (versus alphabetic characters which would be considered a different class), or all radar data (versus seismic data which would be considered a different class).

At 220, an independent artificial neural network is created for each class in the dataset. As noted above, historically a single, large artificial neural network was created for all the classes in a dataset, and then the single, large artificial neural network was trained to recognize all the classes. This, at times at least, created a very large, slow executing, and difficult to manage artificial neural network with many hyperparameters.

At 230, all classes in the dataset are provided to each independent artificial neural network, and at 240, each independent artificial neural network is separately trained to respond to a single particular class in the dataset and to reject all other classes in the dataset. So, for example, if one wants a class level artificial neural network to identify the ten digits 0-9, at least ten different and independent class level artificial neural networks are created—one for each different digit. In reality however, each digit will have associated with it several independent class level networks. Then, all the data in the dataset that include all the classes are provided to each independent class level artificial neural network, and each independent neural network is trained to respond to its associated digit. That is, for example, the first independent artificial neural network receives all the data containing all the classes, and is trained to only respond to the digit "0".

At 250, output from each independent artificial neural network is provided to a combining classifier, and at 260, the combining classifier is trained to identify all classes from the data based on the output of all the independent artificial neural networks. After the independent neural networks and the combining classifier are trained, the neural networks and classifier can be used analyze and identify real data. Such real data are provided to each independent artificial neural network in a dataset at 270. At 271, a single class is identified by one of the independent artificial neural networks. As indicated at 272, if only one independent artificial neural network signals an identification, then the combining classifier is bypassed. However, if two or more independent artificial neural networks signal an identification, then the combining classifier must reconcile this conflict as described above. If neither the independent artificial neural networks nor the combining classifier is able to identify a single class, then as indicated at 273, a new independent artificial neural network can be added.

Operations 210-260 and 270-273 detail the main functionality of a system of class level artificial neural networks. Operations 280-295 provide some further detailed features or operations of such a system. For example, at 280, it is indicated that all the independent artificial neural networks can be trained in parallel. Such parallel training can of course result in a rather large savings in processing time.

At 285, it is indicated that the independent artificial neural networks can include a plurality of distinct architectures. And as indicated at 286, the architecture for a particular independent artificial neural network can be selected and/or designed to optimize the performance of the particular independent artificial neural network for the class for which it was trained to respond. For example, one particular architecture may be well-suited to recognize digits containing arcs such as the digits 0, 8, and 9, and another architecture may be well-suited to recognize the class of digits that consist mainly of straight lines and angles such as 1, 4, and 7.

An example of a particular application of multiple, independent class level artificial neural networks is in training the class level artificial neural networks to identify radar data (295). Being able to classify radar data could be helpful in detecting and identifying radar targets in the field.

Figure 3:
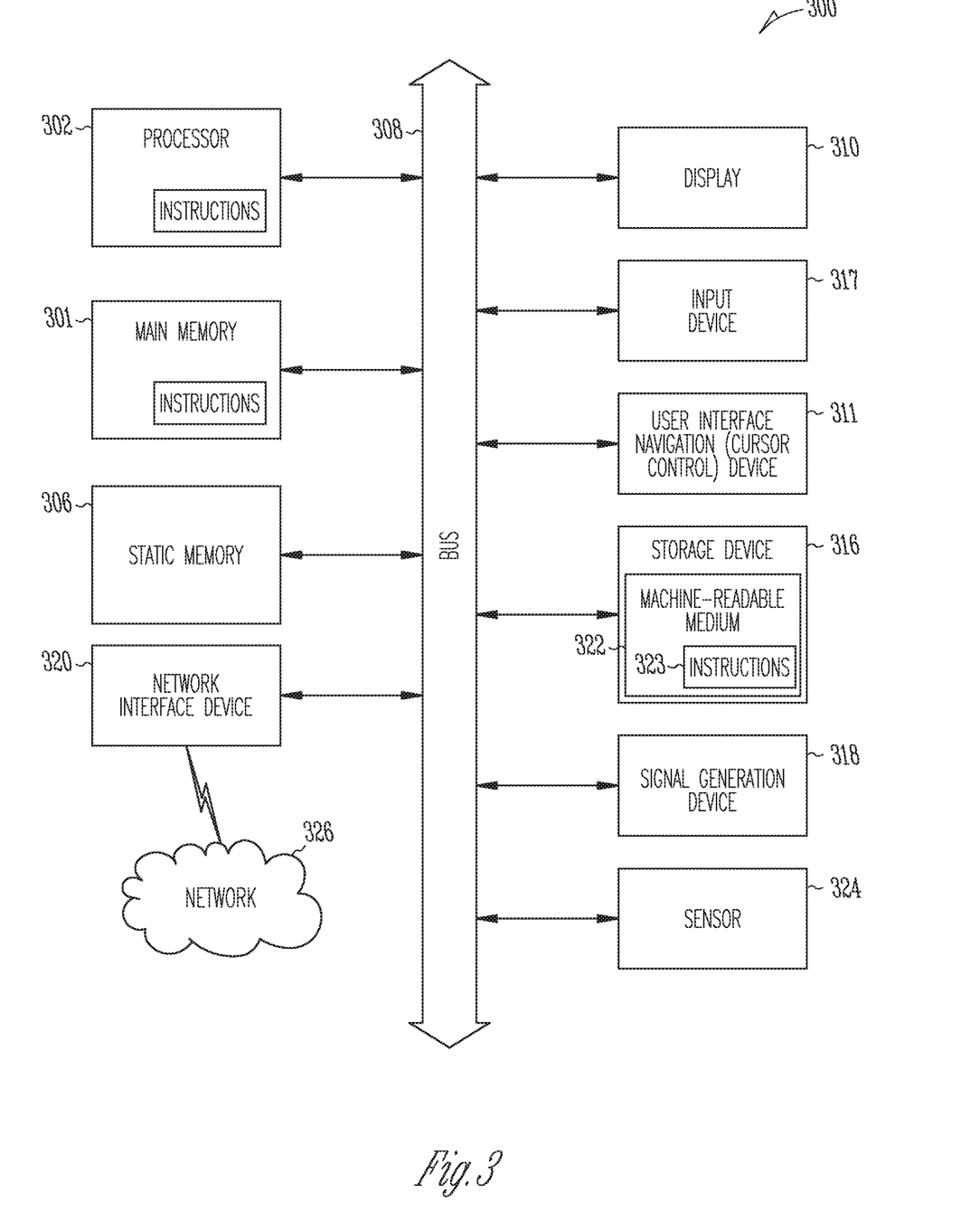
FIG. 3 is a block diagram illustrating a computer system upon which one or more embodiments of the present disclosure can execute.

FIG. 3 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 301 and a static memory 306, which communicate with each other via a bus 308. The computer system 300 may further include a display unit 310, an alphanumeric input device 317 (e.g., a keyboard), and a user interface (UI) navigation device 311 (e.g., a mouse). In one embodiment, the display, input device and cursor control device are a touch screen display. The computer system 300 may additionally include a storage device 316 (e.g., drive unit), a signal generation device 318 (e.g., a speaker), a network interface device 320, and one or more sensors 321, such as a global positioning system sensor, compass, accelerometer, or other sensor.

The drive unit 316 includes a machine-readable medium 322 on which is stored one or more sets of instructions and data structures (e.g., software 323) embodying or utilized by any one or more of the methodologies or functions described herein. The software 323 may also reside, completely or at least partially, within the main memory 301 and/or within the processor 302 during execution thereof by the computer system 300, the main memory 301 and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers), including a computer readable medium, that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 323 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
    identifying a plurality of classes in a first dataset;
    generating independent artificial neural networks by creating an independent artificial neural network for each class in the plurality of classes in the first dataset such that an architecture for each independent artificial neural network optimizes performance for a single class for which the each independent artificial neural network is trained, wherein the architecture for each independent artificial neural network is distinct and is established by selecting a combination of layers;
    providing all classes in the first dataset into each independent artificial neural network;

separately training each independent artificial neural network to respond to the single class in the first dataset for which the architecture of the each independent artificial neural network was optimized and to reject all other classes in the first dataset;
providing output from each independent artificial neural network to a combining classifier;
training the combining classifier to identify all classes from the first dataset based on the output of all the independent artificial neural networks;
providing a second dataset to each independent artificial neural network; and
identifying the single class in the second dataset using each independent artificial neural network such that a particular independent artificial neural network is signaled as having identified the second dataset when a value calculated by the particular independent artificial neural network for the second dataset exceeds a threshold.

2. The process of claim 1, comprising bypassing the combining classifier when only one of the independent artificial neural networks identifies the single class in the second dataset.

3. The process of claim 1, comprising adding a new independent artificial neural network when the combining classifier is not able to identify the single class.

4. The process of claim 1, wherein the independent artificial neural networks are trained in parallel.

5. The process of claim 1, comprising designing an architecture for a particular independent artificial neural network to optimize performance of the particular independent artificial neural network for the single class that the particular independent artificial neural network is trained to respond.

6. A non-transitory computer readable medium comprising instructions that when executed by a processor execute a process comprising:
identifying a plurality of classes in a first dataset;
generating independent artificial neural networks by creating an independent artificial neural network for each class in the plurality of classes in the first dataset such that an architecture for each independent artificial neural network optimizes performance for a single class for which the each independent artificial neural network is trained, wherein the architecture for each independent artificial neural network is distinct and is established by selecting a combination of layers;
providing all classes in the first dataset into each independent artificial neural network;
separately training each independent artificial neural network to respond to the single class in the first dataset for which the architecture of the each independent artificial neural network was optimized and to reject all other classes in the first dataset;
providing output from each independent artificial neural network to a combining classifier;
training the combining classifier to identify all classes from the first dataset based on the output of all the independent artificial neural networks;
providing a second dataset to each independent artificial neural network; and
identifying the single class in the second dataset using each independent artificial neural network such that a particular independent artificial neural network is signaled as having identified the second dataset when a value calculated by the particular independent artificial neural network for the second dataset exceeds a threshold.

7. The non-transitory computer readable medium of claim 6, comprising instructions for bypassing the combining classifier when only one of the independent artificial neural networks identifies the single class in the second dataset.

8. The non-transitory computer readable medium of claim 6, comprising instructions for adding a new independent artificial neural network when the combining classifier is not able to identify the single class.

9. The non-transitory computer readable medium of claim 6, wherein the independent artificial neural networks are trained in parallel.

10. The non-transitory computer readable medium of claim 6, comprising instructions for designing an architecture for a particular independent artificial neural network to optimize a performance of the particular independent artificial neural network for the single class that the particular independent artificial neural network is trained to respond.

11. A system comprising:
a computer processor; and a memory coupled to the computer processor;
wherein the computer processor and the memory are operable for:
identifying a plurality of classes in a first dataset;
generating independent artificial neural networks by creating an independent artificial neural network for each class in the plurality of classes in the first dataset such that an architecture for each independent artificial neural network optimizes performance for a single class for which the each independent artificial neural network is trained, wherein the architecture for each independent artificial neural network is distinct and is established by selecting a combination of layers;
providing all classes in the first dataset into each independent artificial neural network;
separately training each independent artificial neural network to respond to the single class in the first dataset for which the architecture of the each independent artificial neural network was optimized and to reject all other classes in the first dataset;
providing output from each independent artificial neural network to a combining classifier;
training the combining classifier to identify all classes from the first dataset in a second dataset based on the output of all the independent artificial neural networks;
providing a second dataset to each independent artificial neural network; and
identifying the single class in the second dataset using each independent artificial neural network such that a particular independent artificial neural network is signaled as having identified the second dataset when a value calculated by the particular independent artificial neural network for the second dataset exceeds a threshold.

12. The system of claim 11, wherein the computer processor is operable for bypassing the combining classifier when only one of the independent artificial neural networks identifies the single class in the second dataset.

13. The system of claim 11, wherein the computer processor is operable for adding a new independent artificial neural network when the combining classifier is not able to identify the single class.

14. The system of claim 11, wherein the independent artificial neural networks are trained in parallel.

15. The system of claim 11, wherein the processor is operable for designing an architecture for a particular independent artificial neural network to optimize a performance of the particular independent artificial neural network for the single class that the particular independent artificial neural network is trained to respond.

* * * * *